United States Patent

Ichikawa et al.

[11] Patent Number: 5,701,377
[45] Date of Patent: Dec. 23, 1997

[54] PLASTIC LIGHT TRANSMITTING BODY, ITS PRODUCTION METHODS AND APPARATUS

[75] Inventors: Atsuko Ichikawa; Satoshi Honda; Takayuki Katoh; Akira Ishisaka, all of Hino, Japan

[73] Assignee: Konica Corporation, Tokyo, Japan

[21] Appl. No.: 533,435

[22] Filed: Sep. 25, 1995

[30] Foreign Application Priority Data

Sep. 27, 1994 [JP] Japan .................. 6-231450

[51] Int. Cl.[6] ............................ G02B 6/02
[52] U.S. Cl. .................. 385/124; 385/143; 385/141; 264/1.24
[58] Field of Search ................... 385/121, 122, 385/123, 124, 125, 126, 127, 128, 143, 141; 526/329; 427/162, 163.2, 372.2, 358; 264/1.24, 1.29, 1.38-1.7

[56] References Cited

U.S. PATENT DOCUMENTS 5,555,525  9/1996  Ho et al. ......................... 385/143

FOREIGN PATENT DOCUMENTS 49-65840  6/1974  Japan .
51-87049  7/1976  Japan .
57-20601  4/1982  Japan .

*Primary Examiner*—Phan T. H. Palmer
*Attorney, Agent, or Firm*—Finnegan, Henderson, Farabow, Garrett & Dunner, L.L.P.

[57] ABSTRACT

In method of manufacturing a light transmitting plastic member having a desired optical characteristic distribution from a gelled base material having a rotation axis, the base material is places in a monomer having an optical characteristics different from that of the base material, and is rotated around the rotation axis thereof in the monomer so that the monomer is diffused into the base material while the base material is rotated. The light transmitting plastic member is made from the base material.

21 Claims, 9 Drawing Sheets

FIG. 2 (a)
FIG. 2 (b)
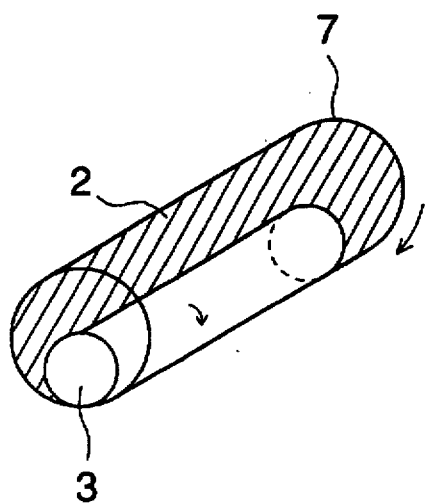
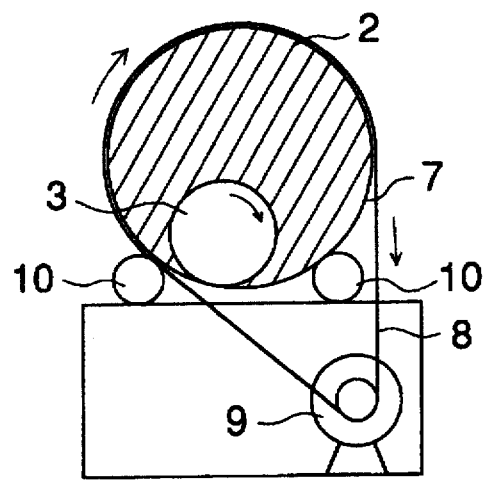
FIG. 3
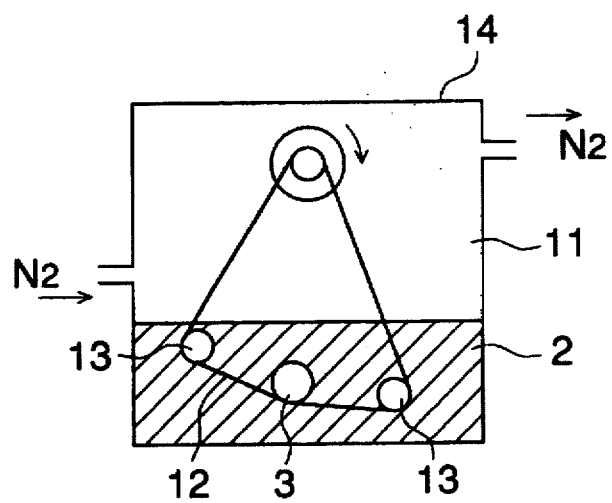

PLASTIC LIGHT TRANSMITTING BODY, ITS PRODUCTION METHODS AND APPARATUS

BACKGROUND OF THE INVENTION

The present invention relates to a plastic light transmitting body or a plastic light transmitting element having optical characteristic distribution, such as a refractive index, Abbe's number, etc., and its production apparatus and methods.

Conventionally, for example, the following methods have been disclosed as a production method for a refractive index distribution type plastic light transmitting element (hereinafter, referred to as a GRIN transmitting element).

(1) A two step copolymerization method

With respect to a gel rod, in which part of a monomer is polymerized, the monomer having a refractive index different from that of the gel rod, is diffused, and after a refractive index distribution has been formed, the monomer is polymerized (refer to Japanese Patent Publication Open to Public Inspection No. 65840/1974).

(2) A method by which a gel rod is immersed in a monomer in the two step copolymerization method Specifically, a structure in which diffusion is performed "while an immersing container is being rotated on a central axis" is disclosed on page 721 of Vol. 35, No. 11 of a collection of theses on highpolymers.

(3) A polymerization speed ratio method

A method in which two different monomers are accommodated in a predetermined container, and a polymerization speed ratio of the two monomers from the surface of the container to the inside of the container is used for forming a refractive index distribution (refer to Japanese Patent Publication Open to Public inspection No. 87049/1976).

(4) A volatilization method

A method in which polymer is mixed with a volatile monomer, and after the mixture is molded, the monomer is volatilized, thereby, a refractive index distribution is formed (refer to Japanese Patent Publication No. 20601/1982).

In a diffusion process of a monomer, it is difficult to prevent deformation of the gel rod, and to accurately control the diffusion of the monomer. Accordingly, it has been clear that, sometimes, some amount of "shifts of the center of the refractive index distribution with respect to the center of the outer form of the light transmitting element", that is, "decentering" occurs, resulting in problems during actual use of the GRIN light transmitting element.

For example, in uses for lenses for cameras or glasses, or image forming elements such as micro-lens arrays, or fiberscopes, the decrease of eccentricity, that is, an accurate coincidence of the center of the refractive index distribution with the center of the outer form of the light transmitting element is essential in the lens design and in determination of the optical axis. Further, in uses for light conducting bodies for transmitting light signals in optical communication, or the like, the eccentricity does not cause as large a problem as the image forming elements, but there is a possibility that it causes communication losses and deteriorates S/N ratios. Accordingly, the reduction of communication losses is essential.

SUMMARY OF THE INVENTION

Such problems as the "shifts of the center of the refractive index distribution with respect to the center of the outer form of the light transmitting element" could not be solved by the above-described conventional technologies.

Therefore, an objective of the present invention is to provide a plastic light transmitting element, in which the shift of the center of the optical characteristic distribution with respect to the center of the outer form of the light transmitting element is largely prevented, and to provide its production methods and apparatus.

In order to accomplish the above-described objective, the present invention has the structure in which: while a gel light transmitting element base material, a part of which is previously polymerized, is being rotated around the rotation axis of the base material in a monomer having optical characteristics different from those of the base material, the monomer is diffused into the base material, and a plastic light transmitting element having the optical characteristic distribution is produced.

The present invention includes the structure in which: the base material is rotated by the movement of a supporting member, and the plastic light transmitting element is produced.

The present invention includes the structure in which: the base material is rotated by the rotation of the supporting member, and the plastic light transmitting element is produced.

The present invention includes the structure in which: the supporting member is a monomer container in which the monomer is accommodated, and the base material is rotated by the rotation of the monomer container, so that the plastic light transmitting element is produced.

The present invention includes the structure in which: a plurality of monomer containers are integrally rotated, and thereby, the base material is rotated, so that the plastic light transmitting element is produced.

The present invention includes the structure in which: the supporting member is composed of a pair of rollers, and the base material is rotated by the rotation of the pair of rollers, so that the plastic light transmitting element is produced.

The present invention includes the structure in which: the supporting member is a belt, and the base material is rotated by the rotation of the belt, so that the plastic light transmitting element is produced.

The present invention includes the structure in which: the base material is rotated when the supporting member is oscillated, and the plastic light transmitting element is produced.

The present invention includes the structure in which: the supporting member is a monomer container, in which the monomer is accommodated, and the base material is rotated when the monomer container is oscillated, so that the plastic light transmitting element is produced.

The present invention includes the structure in which: the base material is rotated when the supporting member is moved horizontally, and the plastic light transmitting member is produced.

The present invention includes the structure in which: the supporting member is a monomer container, in which the monomer is accommodated, and the base material is rotated when the monomer container is moved horizontally, so that the plastic light transmitting element is produced.

The present invention includes the structure in which: the base material is rotated when the base material is rolled down an inclined surface, and the plastic light transmitting element is produced.

The present invention includes the structure in which: the base material is rotated by a flow of monomer, and the plastic light transmitting element is produced.

The present invention includes the structure in which: the base material is rotated by a flow of gas in the monomer, and the plastic light transmitting element is produced.

The present invention includes the structure in which: the base material is rotated around its symmetrical rotation axis, and the plastic light transmitting element is produced.

The present invention includes the structure in which: the symmetrical rotation axis is approximately horizontal, and the plastic light transmitting element is produced.

The present invention includes the structure in which: the rotation axis of the base material is approximately horizontal, and the plastic light transmitting element is produced.

The present invention includes the structure in which: the base material is rotated at a speed of 1 through 500 rpm in the monomer, and the plastic light transmitting element is produced.

The present invention includes the structure in which: the base material is rotated at a speed of 5 through 100 rpm in the monomer, and the plastic light transmitting element is produced.

The present invention includes the structure in which: the plastic light transmitting element has an optical distribution; and when a coefficient of the second order of the refractive index distribution is expressed by $N_{1m}$, which is a value corresponding to the central wavelength in the wavelength region to be used, in the case where the refractive index distribution is expressed by the following equation with respect to the distance r (mm) from the optical axis, $$\Delta N = N_0 + N_1 r^2 + N_2 r^4 + \ldots,$$

and when the lens thickness on the optical axis of the light transmitting element is expressed by t (mm), then, a shift H (mm) between the center of the optical distribution and the center of the outer form of the light transmitting element satisfies the following equation:

[Equation 3]

$$H \leq 2.0 \times 10^{-3}/(|N_{1m}| \times t)$$

The present invention includes the structure in which: the plastic light transmitting element has an optical characteristic distribution; and when the coefficient of the second order of the refractive index distribution has values $N_{1s}$ and $N_{1l}$, respectively corresponding to a short wavelength side and a long wavelength side in the wavelength region to be used, in the case where the refractive index distribution is expressed by the following equation with respect to the distance r (mm) from the center of the optical axis, $$\Delta N = N_0 + N_1 r^2 + N^4 + \ldots,$$

and when the lens thickness on the optical axis of the light transmitting element is expressed by t (mm), then, a shift H (mm) between the center of the optical distribution and the center of the outer form of the light transmitting element satisfies the following equation:

[Equation 4]

$$H \leq 2.0 \times 10^{-4}/(|N_{1s} - N_{1l}51 \times t).$$

According to the present invention, in the process in which, with respect to a gel light transmitting element (a gel base material), a part of which is previously polymerized, a monomer having optical characteristics different from that of the gel base material is diffused, since the base material is rotated around the rotation axis of the base material in the monomer, the base material is in uniform contact with the monomer, and a shift of the center of the optical characteristic distribution with respect to the center of the outer form of the plastic light transmitting element can be largely reduced.

According to the present invention, the base material is rotated in the monomer when a torque is applied to the base material by the movement of the supporting member, and the monomer can be in uniform contact with the base material.

According to the present invention, the movement of the supporting member is rotation, and the base material is rotated in the monomer when the supporting member is rotated.

According to the present invention, the rotating supporting member is a monomer container in which the monomer is accommodated, and the base material is rotated in the monomer when the monomer container is rotated.

According to the present invention, in the structure in which the rotating supporting member is a monomer container, a plurality of monomer containers are integrally rotated, and the diffusing process is performed when the base materials in the monomer containers are simultaneously rotated.

According to the present invention, the supporting member is a pair of rollers, and the base material, supported by the pair of rollers, is rotated in the monomer when the rollers are rotated.

According to the present invention, the supporting member is a belt, and the base material, supported by the belt, is rotated in the monomer when the belt is rotated.

According to the present invention, the movement of the supporting member is oscillation, and the base material is rotated in the monomer when the supporting member is oscillated.

According to the present invention, the oscillating supporting member is a monomer container, and the base material, accommodated in the monomer container with the monomer, is rotated when the monomer container is oscillated.

According to the present invention, when the supporting member is horizontally moved, the base member is rotated in the monomer.

According to the present invention, the horizontally moving supporting member is the monomer container, and the base material is rotated in the monomer container when the monomer container is horizontally moved.

According to the present invention, the system is structured such that the base material is rolling down an inclined surface, and the base material is rotated in the monomer and diffusion is performed while the base material is rolling down.

According to the present invention, a monomer flow is generated, and thereby, the base material is rotated in the monomer.

According to the present invention, a gas flow is generated in the monomer, and the base material is rotated in the monomer by the gas flow.

According to the present invention, when the base material is symmetrically shaped around its rotation axis, like a cylinder, the diffusion is performed while the base material is being rotated in the monomer on its symmetrical rotation axis.

According to the present invention, the symmetrical rotation axis is positioned approximately horizontally, and the base material is rotated in the monomer while the base material is being rotated on its horizontal axis.

According to the present invention, the rotation axis of the base material is horizontal, and the base material is in contact with the monomer while the base material is being rotated on its horizontal axis.

According to the present invention, when diffusion is performed while the base member is being rotated in the monomer, the appropriate rotation speed of the base material is 1 through 500 rpm.

According to the present invention, a more appropriate rotation speed of the base material is 5 through 100 rpm.

According to the present invention, allowable values of a shift H (mm) between the center of the optical characteristic distribution and the center of the outer form of the light transmitting element are set according to the wavelength region to be used and the secondary characteristic of the refractive index, and a plastic light transmitting element having a shift within appropriate allowable values is obtained.

In this connection, a two step copolymerization method is applied to the present invention, and the plastic light transmitting element is produced in the following steps:

① Preparation of a monomer solution for a base material: monomer is mixed with a predetermined amount of polymerization initiator.

② Production of a gel base material: a part of the monomer solution is polymerized by heat or activation energy rays, and the gel base material is obtained.

③ Preparation of diffusion monomer: monomer is mixed with a predetermined amount of polymerization initiator.

④ Diffusion: the gel base material is immersed in the diffusion monomer solution under predetermined conditions. In such diffusion processes, methods and apparatus according to the present invention are used for preventing eccentricity of the optical characteristic distribution.

⑤ Hardening: the remaining monomer components of the gel base material, in which the diffusion process has been completed, are sufficiently polymerized by heat or activation energy rays (light beams, radioactive rays, etc.).

⑥ Cutting, polishing: ends of the rod are cut and polished, and the plastic light transmitting element is obtained.

As the monomer which is used for the gel base material and diffusion, a monomer having a polymerization functional group which is polymerized by heat, activation energy rays, or the like, can be used in this invention. For example, a monomer having an unsaturated group, such as vinyl monomer, allyl monomer, acrylic monomer, methacrylic monomer, styrene monomer, acetylene monomer, or the like, can be used singly, or as a mixture of plural monomers.

As the monomer to form the gel base material, a compound which has plural polymerizable unsaturated groups in one molecule, is desirable. For example, ethylene glycol dimethacrylate, diethylene glycol bisallyl carbonate, divinyl benzene, diallyl isophthalate, diallyl terephthalate, or the like, can be used. In the monomers listed above, the monomer for the gel base material and the diffusion monomer having optical characteristics different from that of the gel base material are appropriately selected corresponding to the optical characteristic distribution to be used.

On the other hand, for a polymerization initiator, widely known thermal polymerlization initiators or photopolymerization initiators are preferably used, and a widely known radical initiator can be used. Specifically, for example, diisopropyl peroxy dicarbonate, benzoyl peroxide, azobisisobutyronitrile, tert-butylhydro peroxide, or the like, can be used.

Further, the gelling ratio of the light transmitting element is preferably 15through 40%, because the gel-condition, in which a form of the rod is maintained, can not be obtained when the gelling ratio is below 15%, and it is difficult to diffuse monomer is into the gel-structure because polymerization is excessively advanced when the gelling ratio is over 40%.

The gelling ratio is defined as the ratio (percentage: %) of the weight W(P) of the polymer after polymerization to the weight W(M) of the monomer used for polymerization, and expressed by the following equation:

$$\text{Gelling ratio } (\%) = W(P)/W(M) \times 100$$

The polymer weight W(P) is the weight of the portion which is not dissolved when a solvent, in which monomers can be dissolved and polymers can not be dissolved, is used and the gel base material is processed by a predetermined method, according to conventional methods.

The rotations of the gel base material in the diffusion process is preferably 1 through 500 rpm, and desirably 5 though 100 rpm. When the rotation of the gel base material is less than 1 rpm, uniform diffusion into the gel base material is not sufficiently performed, and eccentricity of the center of the optical characteristic distribution occurs. When the rotations of the gel base material is more than 500 rpm, the side surface of the gel base material, or the entire gel base material is broken due to the friction with the rotation member such as rollers, the belt, or the like, and thereby, there is a possibility that diffusion itself can not be performed. Also in cases where the base material is rotated by the movement of the monomer container, it is preferable to adjust the number of rotations of the gel material so that it is within the above range.

The rotation axis of the gel base material is a line, which is the center of rotation, when the gel base material is rotated, and which is a virtual line. Accordingly, it does not necessarily mean a bar-like shaft. Since the present invention is structured such that the gel base material is rotated around its rotation axis, the central line of the rotation intersects the gel base material.

Further, the rotation axis of the gel base material is preferably approximately horizontal as described above. In this structure, the influence of gravity on the gel base material can be excluded, and thereby, uniform diffusion can be performed parallel to the rotation axis of the base material. The rotation axis of the gel base material means the center axis of the rotation of the gel base material, which penetrates the gel base material, and specifically, when the shape of the gel base material is rotationally symmetrical, like a cylinder, the rotation axis of the gel base material may be its symmetrical rotation axis.

After the diffusion into the gel base material has been completed, polymerization is further performed, and then, completed. For polymerization, any means such as heat or activation energy rays such as ultraviolet rays, electron rays, radioactive rays, etc., can be used. At this time, the gel base material is polimerized so that its cross section is perfectly circular.

The gel base material, in which polymerization has been completed, may be used as rod lenses after polishing both ends of the gel base material, or may be used as lenses after cutting and polishing.

In the present invention, the supporting member specifies a member by which the gel base material is supported in the monomer, and which contributes to the rotation of the gel base material, and specifically, specifies the monomer container, rollers, the belt, and the inclined surface, etc. Further, the monomer container specifies a container in which monomer and the gel base material are accommodated together, and, for example, a container which is pipe-shaped or box-shaped.

In the case where the supporting member is an inclined surface, it is preferable that the inclined surface has a shape in which the gel base material and the diffusion monomer can be held, and the surface is inclined such that the gel base material is rotated under the above-described conditions of rotation, and the diffusion monomer is preferably circulated by a circulation apparatus or the like.

Further, in the diffusion process, in cases where the gel base material or the diffusion monomer is exposed to air, it is preferable to substitute the atmosphere in the diffusion process with an inert gas. In cases where it is necessary to introduce a gas into the diffusion monomer (for example, in the case where the gel base material is rotated by a gas flow), it is also preferable to use an inert gas. As inert gases, $N_2$, He, Ar, or the like, is preferable.

The amount of monomer to be used for diffusion is preferably more than the amount in which the whole gel base material can be immersed in the monomer. In cases where a portion of the gel base material projects from the surface of the monomer solution, the atmosphere above the surface of the monomer solution is preferably an inert gas atmosphere of $N_2$, He, Ar, etc.

BRIEF DESCRIPTION OF THE DRAWINGS

FIG. 1(a) is a perspective view of a container, and FIG. 1(b) is a perspective view of the apparatus.

FIGS. 2(a) and 2(b) are views showing a diffusion apparatus of Example 2. FIG. 2(a) is a perspective view of the container, and FIG. 2(b) is a front view of the apparatus.

FIG. 3 is a front view showing a diffusion apparatus of Example 3.

FIG. 4(a) is a front view, and FIG. 4(b) is a side view of the apparatus.

FIG. 5(a) is a perspective view of the container, and FIG. 5(b) is a front view of the apparatus.

FIG. 6(a) is a perspective view of the container, and FIG. 6(b) is a front view of the apparatus.

FIG. 8(a) is a perspective view of the container, and FIG. 8(b) is a front view of the apparatus.

DETAILED DESCRIPTION OF THE INVENTION

Figure 1:
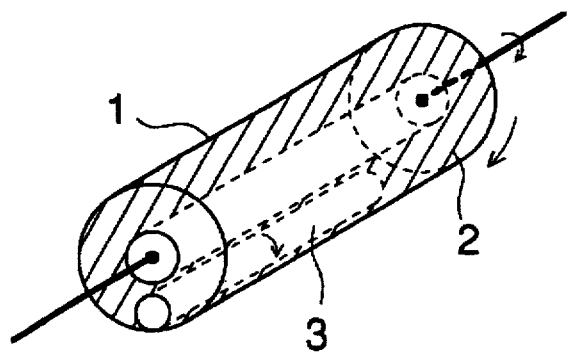
FIGS. 1(a) and 1(b) are views showing a diffusion apparatus of Example 1.
Figure 1:
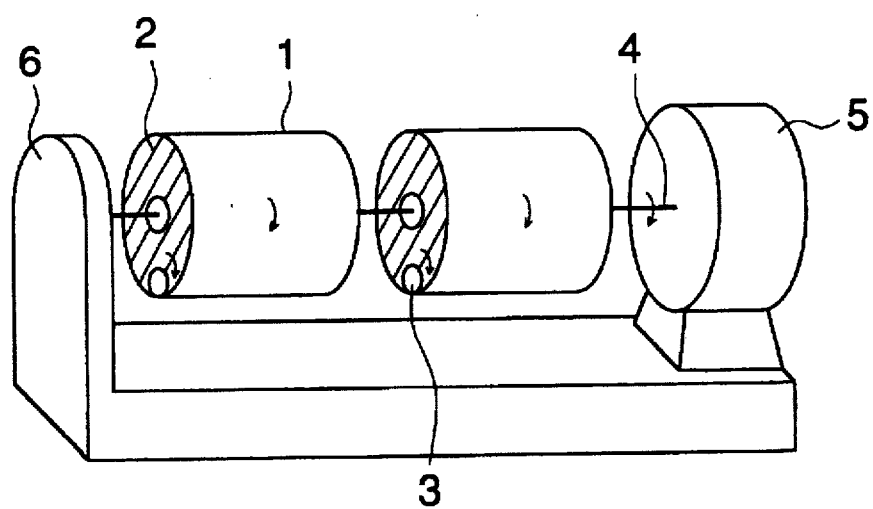

An example of the present invention will be described below.

[EXAMPLE 1]

① Gel rod (cylindrical gel base material) and diffusion monomer (a) Gel rod

Monomer: diethylene glycol bisallyl carbonate (made by PPG Co., whose product name is CR-39, hereinafter referred to as CR-39)

Polymerization initiator: diisopropyl peroxydicarbonate (Japan Fats and Oils Co., whose product name is Peroil IPP-27 (CR) and hereinafter referred to as IPP)

Production method: After IPP of 2.0 wt % has been mixed with CR-39, the mixture is injected into a fluororesin tube having an inside diameter of 12.0 mm, and a length of 100 mm. After this tube with contents has been heated for 2 hours and 15 minutes in a 50° C. water bath, the heated mixture is removed from the fluororesin tube, and the gel rod is thereby produced.

(b) Diffusion monomer

Monomer: diallyl isophthalate (made by Daiso Co., whose product name is Dap 100 monomer and hereinafter referred to as DAI)

Polymerization initiator: IPP

Production method: IPP of 2.0 wt % is mixed with DAI.

② Diffusion apparatus

As shown in FIG. 1(a), numeral 1 is a cylindrical diffusion monomer container, and diffusion monomer 2 is accommodated in the ring-shaped space. The gel rod 3 (optical transmitting element base material) is inserted into a part of the space of the container 1 in the axial direction. A drive shaft 4 shown in FIG. 1(b) is supported in the axial direction by both end surfaces of the diffusion monomer container 1. The container 1 is rotatably supported between a motor 5 and a bearing portion 6 by the drive shaft 4 almost horizontally, and is rotated on the drive shaft 4 by the rotational driving force of the motor 5.

The rotation means is composed of the drive shaft 4, the bearing portions 6 and the motor 5.

When the diffusion monomer container 1, which is a support member, is rotated on the shaft, the gel rod 3 accommodated in the hollow container is rotated around the horizontal symmetric rotation axis (rotation axis) in the diffusion monomer 2 while the contact surface of the gel rod 3 with the inner wall of the container 1 is always changing in the vicinity of the bottom inner portion of the hollow space.

In this connection, the motor 5 is adjusted so that the number of rotation of the gel rod 3 is almost 20 rpm.

The diffusion monomer container 1 may be structured in such a manner that it is singly provided on the same shaft, or a plurality of containers 1 are connected with each other in the axial direction and a plurality of the diffusion monomer containers 1 may be integrally rotated as shown in FIG. 1(b).

Further, the gel rod 3, which is inserted into the diffusion monomer container 1, may be singly inserted into a container, or a plurality of gel rods may be arranged in the axial direction or on the circumference.

Further, the space, in which diffusion monomer is accommodated, need not be ring-shaped, but may be formed into a cylinder.

Due to the diffusion apparatus, the gel rod 3 comes into contact with the inner wall of the container, and the contact surface always changes. Accordingly, contact of the gel rod 3 with the diffusion monomer 2 is uniform, and thereby, the diffusion monomer 2 can be uniformly diffused. Further, the diffusion monomer 2 is mixed by the rotation of the container 1, and thereby, uniform diffusion can be achieved. Still further, when the gel rod 3 is rotated while the gel rod 3 is horizontally supported, deformation, such as collapse caused by its own weight, can be avoided.

③ Diffusion and hardening process

The diffusion is achieved for 10 hours while the gel rod is rotated by the diffusion apparatus described in ②. After diffusion processing has been completed, the gel base material is taken from the container and placed in a temperature controlled oven. The temperature of the oven is increased from 40° C. to 90° C. for 10 hours, and thereby the gel base material is hardened. Then, copolymerization of the gel base material is completed and the sectional surface of the gel rod is made perfectly circular. After the hardening process, cooling, cutting and polishing are performed so that a plastic lens (plastic optical transmitting element) having the optical characteristic distribution (Abbe's number, refractive index) is manufactured.

[EXAMPLE 2]

① Gel rod and diffusion monomer
(a) Gel rod

Monomer: CR-39

Polymerization initiator: IPP

Production method: A gel rod is produced by the same production method as that in Example 1.

(b) Diffusion monomer

Monomer: DAI

Polymerization initiator: IPP

Production method: IPP of 3.0 wt % is mixed with DAI.

② Diffusion apparatus

As shown in FIG. 2, the diffusion monomer 2 and the gel rod 3 are accommodated in a diffusion monomer container 7, which is a supporting member, having a cylindrical space. The diffusion container 7 is supported by two rollers 10, which are horizontally and parallelly arranged. A belt 8 is stretched between the outer periphery of the container 7 and a motor 9, and the diffusion monomer container 7 is rotated around the shaft while rollers 10 are rotating, when the belt 8 is rotated by the motor 9.

A rotation means is composed of the rollers 10, the belt 8 and the motor 9.

The gel rod 3 accommodated in the container is rotated around its horizontal, symmetric rotation axis in the diffusion monomer 2 while coming into contact with the inner wall of the container in the vicinity of the lower end portion of the cylindrical space.

In this connection, the rotation of the motor 9 is adjusted so that the number of rotations of the gel rod 3 is approximately 20 rpm.

In the above structure, only one gel rod 3 may be inserted into the diffusion monomer container 7, or a plurality of gel rods may be arranged in the axial direction or on the circumference of the container.

Further, in the diffusion monomer container 7, it is not necessary that the space, in which the diffusion monomer is accommodated, is cylindrical, but the space may be formed into the ring-shape as that in Example 1.

In the above-described diffusion apparatus, the gel rod 3 comes into contact with the inner wall of the container as described in Example 1, however, its contact surface with the inner wall changes continually. Accordingly, the gel rod 3 is in uniform contact with the diffusion monomer 2, and thereby, the diffusion monomer 2 can be uniformly diffused. Further, as the container 7 is rotated, the diffusion monomer 2 is mixed, and thereby, the diffusion monomer 2 is also uniformly diffused. Still further, since the gel rod 3 is rotated while being horizontally supported, the deformation such as collapse due to its weight, or the like, can be avoided.

③ Diffusion and hardening processes

Except that the diffusion apparatus is different from that in Example 1, diffusion and hardening are performed as those in Example 1, in the diffusion process, and plastic lenses (plastic optical transmitting element), having the optical characteristic distribution, are produced.

[EXAMPLE 3]

① Gel rod and diffusion monomer
(a) Gel rod

Monomer: CR-39

Polymerization initiator: IPP

Production method: After IPP of 3.0 wt % has been mixed with CR-39, the mixture is injected into a fluororesin tube having an inside diameter of 12.0 mm, and a length of 100 mm. This tube, injected with the mixture, is heated at 50° C. in a water bath for one hour and 35 minutes, and a gel rod is produced.

(b) Diffusion monomer

Monomer: DAI

Polymerization initiator: IPP

Production method: Monomer is mixed in the same way as that in Example 1.

② Diffusion apparatus

The diffusion monomer 2 is accommodated in a box-shaped diffusion monomer container 14, with a gas portion 11 above it, as shown in FIG. 3. A pair of pulleys 13 are pivotally provided so that the pulleys can be rotated and are submerged in the diffusion monomer 2. A belt 12, which is a supporting member, is wound between the motor 9, mounted in the gas portion 11, and the pair of pulleys. The gel rod 3 is held on the belt 12 at the position, which is submerged in the diffusion monomer 2 between the pair of pulleys 13.

When the belt 12 is rotated by the motor 9, the gel rod 3 is rotated around its horizontal, symmetrical rotation axis on the belt 12. The rotation means is composed of the motor 9, the belt 12 and the pulleys 13.

The motor 9 is adjusted so that the number of rotations of the gel rod 3 is approximately 50 rpm. In this connection, the gas portion 11 is substituted with nitrogen gas (inert gas).

The number of gel rods 3 which are held on the belt 12, may be one, or a plurality of gel rods may be arranged in the axial direction or on the circumference of the container. Further, the position of one pulley, which is located on the feeding side of the belt 12, is preferably lower than that of the other pulley so that the surface of the belt, on which the gel rod 3 is located, is inclined, and the gel rod 3 is rotated at that position.

Due to the above structure, it is not necessary that the container 14 is moved, and the gel rod 3 is rotated in the diffusion monomer 2 by the rotation means disposed in the container. Accordingly, the diffusion monomer 2 can be uniformly diffused.

③ Diffusion and hardening processes

In the diffusion process, diffusion and hardening are performed in the same way as those in Example 1, excepting that the diffusion apparatus is different from that in Example 1. Then, plastic lenses (plastic optical transmitting element) having the optical characteristic distribution are produced.

[EXAMPLE 4]

① Gel rod and diffusion monomer
(a) Gel rod

Monomer: CR-39

P Polymerization initiator: IPP

Production method: After IPP of 2.0 wt % has been mixed with CR-39, the mixture is injected into a fluororesin tube having an inside diameter of 8.0 mm, and a length of 100 mm, and the tube with the mixture is heated in a 45° C. water bath for 4 hours and 30 minutes, so that the gel rod is produced.

(b) Diffusion monomer

The diffusion monomer is mixed in the same way as that in Example 3.

② Diffusion apparatus

Figure 4:
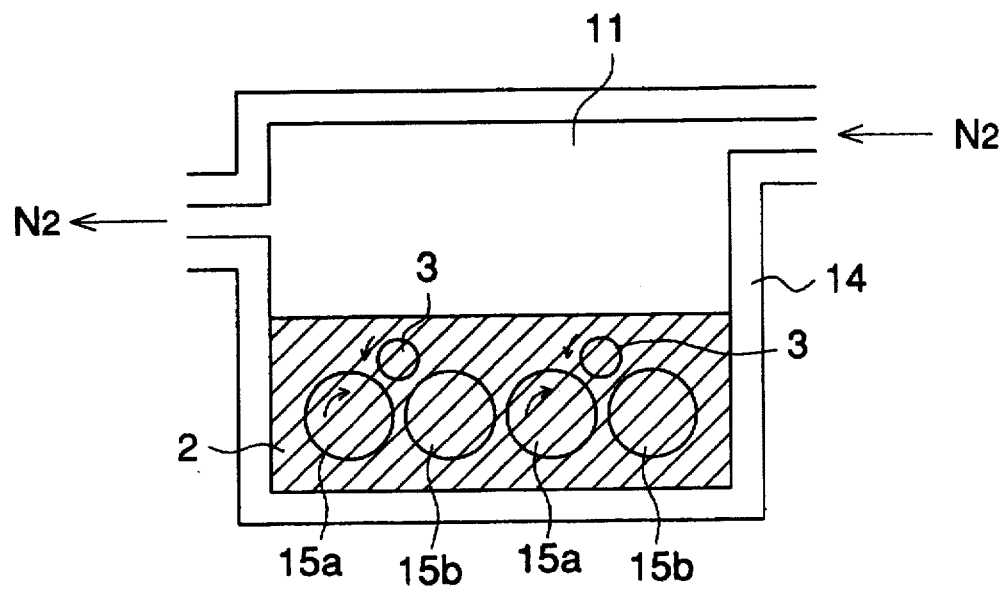
FIGS. 4(a) and 4(b) are views showing a diffusion apparatus of Example 4.
Figure 4:
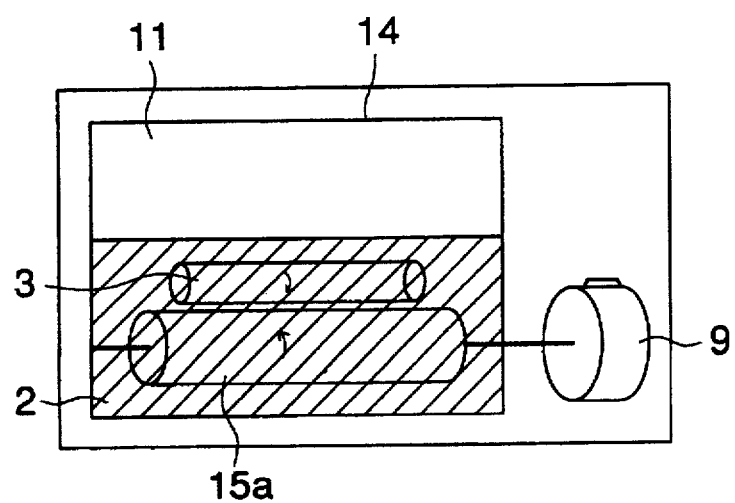

As shown in FIG. 4, in the diffusion monomer container 14, two sets of the gel rod rotation portions, each composed of a pair of rollers 15a and 15b, which are horizontally and parallelly disposed supporting members, are provided such that these rollers are submerged in the diffusion monomer 2. When the space between rollers is less than the diameter of the gel rod 3, each gel rod 3 can be parallelly held between each pair of rollers.

The roller 15a of the pair of rollers 15a and 15b is a drive roller which is rotated by the motor 9, and the other roller 15b is a driven roller which is pivotally supported so that it can be rotated. When the gel rod 3 is rotated around the horizontal and symmetrical rotation axis by the rotation of the drive roller 15a, the rotation force is transmitted to the driven roller 15b through the gel rod 3, and the driven roller 15b is integrally rotated.

The rotation means is composed of the pair of rollers 15a, 15b and the motor 9.

In this connection, the rotation of the motor 9 is adjusted so that the number of rotations of the gel rod 3 is approximately 200 rpm. The gas portion 11 can be substituted with an inert gas such as nitrogen.

Due to the above-described structure, the gel rod 3 can be stably rotated in the diffusion monomer 2 by the rotation means provided in the container, so that the diffusion monomer 2 is uniformly diffused.

This system is not limited to the structure in which two pairs of rollers 15a and 15b are provided, but one pair of rollers or more than three pairs of rollers may be provided. Alternatively, the length of a pair of rollers 15a and 15b may be formed such that a plurality of gel rods 3 are arranged along the shaft and supported by the rollers so that a plurality of gel rods 3 can be rotated by one pair of rollers 15a and 15b.

③ Diffusion and hardening processes

Diffusion is performed for 6 hours while the gel rod is being rotated by the diffusion apparatus described in the above section ②. The gel base material, in which the diffusion process has been completed, is taken from the container, heated from 40° C. to 90° C. for 10 hours and hardened in a temperature controlled oven, and polymerization is completed so that the cross section of the gel base material become perfectly circular due to the rotation of the gel rod. After the hardening process, cooling, cutting and polishing are performed, and plastic lenses (plastic optical transmitting element) having the optical characteristic distribution are produced.

[EXAMPLE 5]

① Gel rod and diffusion monomer (a) Gel rod

It is produced in the same way as that in Example 4.

(b) Diffusion monomer

It is mixed in the same way as that in Example 2.

② Diffusion apparatus

Figure 5:
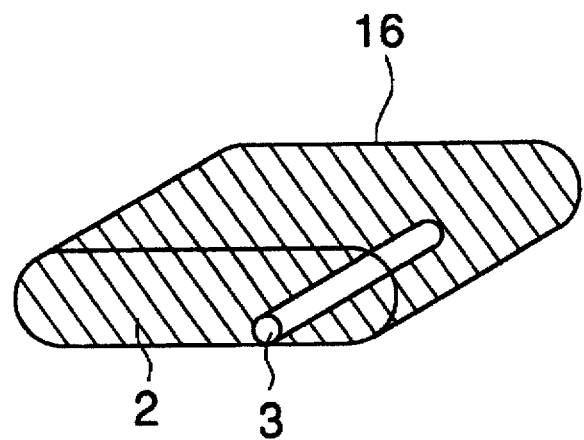
FIGS. 5(a) and 5(b) are views showing a diffusion apparatus of Example 5.
Figure 5:
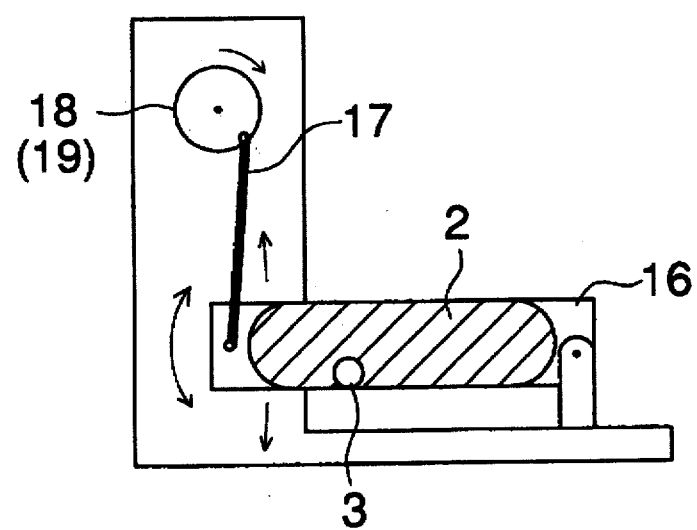

As shown in FIG. 5, the height of the diffusion monomer container 16 is formed slightly larger than the diameter of the gel rod 3. The width of the diffusion monomer container is formed greater than that of the gel rod 3 so that the gel rod 3 can be rotated more than a predetermined number of rotation in the direction perpendicular to its axis on the lower surface of the container.

In the diffusion monomer container 16, one end of the container in the direction of width is rotatably supported, and the other end of the container is supported by one end of a link 17. The other end of the link 17 is connected to an eccentric position of a flange 18 supported by the rotation shaft of the motor 9. When the motor 9 is rotated, the link 17 is reciprocally moved in the vertical direction. Accordingly, the diffusion monomer container 16 is pivoted on the shaft provided on the above-described one end of the container.

A rotation means is composed of the motor 9, the link 17 and the flange 18.

In the above structure, when the diffusion monomer container 16 is pivoted, the lower surface of the container is inclined. Accordingly, the gel rod 3 is reciprocally rotated in the direction perpendicular to its axis on the lower surface of the container. Therefore, the diffusion monomer 2 can be uniformly diffused when the gel rod 3 is rotated around the horizontal axis in the diffusion monomer 2.

The rotation of the motor 9 is controlled so that the number of rotations of the gel rod 3 is approximately 10 rpm.

In this connection, a plurality of gel rods 3 may be positioned end to end or side by side in the container 16.

③ Diffusion and hardening processes

Excepting that the diffusion apparatus is different from that in the diffusion process of Example 4, diffusion and hardening are performed in the same way as that in Example 4 so that plastic lenses (plastic optical transmitting element) having the optical characteristic distribution are produced.

[EXAMPLE 6]

① Gel rod and diffusion monomer (a) Gel rod

It is produced in the same way as that in Example 4 except that the density of IPP is 3.0 wt % and heating time is 2 hours and 45 minutes in this example.

(b) Diffusion monomer

It is mixed in the same way as that in Example 2.

② Diffusion apparatus

Figure 6:
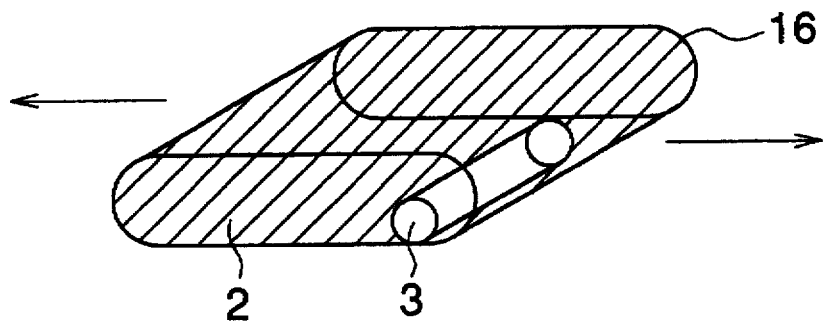
FIGS. 6(a) and 6(b) are views showing a diffusion apparatus of Example 6.
Figure 6:
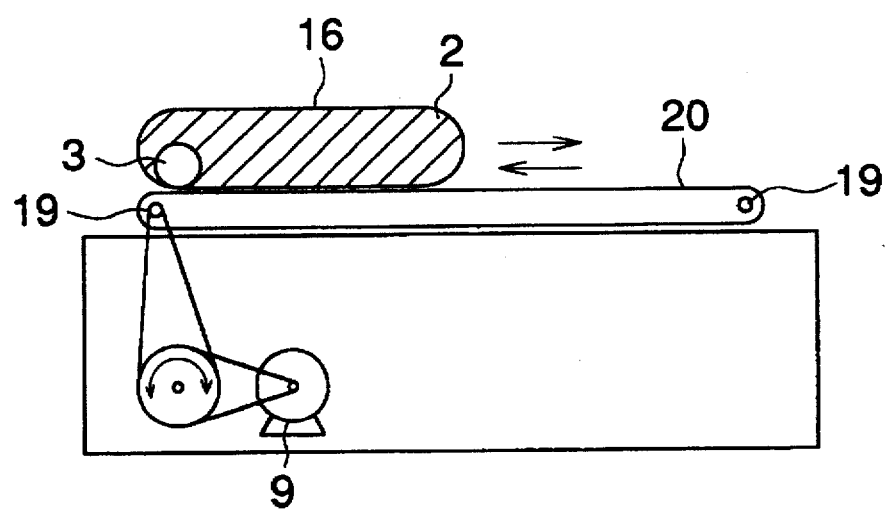

As shown in FIG. 6, the height of the diffusion monomer container 16 is formed slightly larger than the diameter of the gel rod 3 in the same manner as that in Example 5. The width of the container 16 is formed greater than the diameter of the gel rod 3 so that it can be rotated in the direction perpendicular to its axis on the lower surface of the container when the gel rod 3 is placed in the container.

The diffusion monomer container 16 is placed on a belt 20 wound around a pair of rollers 19 which are horizontally and parallelly positioned. The belt 20 is rotated by the motor 9. The motor 9 is controlled so that normal rotation and reverse rotation are repeated.

The rotation means is composed of the roller 19, the belt 20 and the motor 9.

Due to the above structure, the diffusion monomer container 16 is reciprocally moved in the horizontal direction corresponding to the reciprocating motion of the belt 20. At this time, the gel rod 3 is rotated around the horizontal axis in the diffusion monomer 2 by the inertial force, so that the diffusion monomer 2 can be uniformly diffused.

Here, the rotation of the motor 9 is adjusted so that the number of average rotations of the gel rod 3 is approximately 10 rpm.

In this connection, a plurality of containers 16 may be placed on the belt 20. Further, a plurality of gel rods 3 may be accommodated end to end or side by side in the container 16.

③ Diffusion and hardening processes

Diffusion and hardening are performed in the same way as that in Example 4 so that plastic lenses (plastic optical transmitting element), having the optical characteristic distribution, are produced, excepting that the diffusion apparatus is different from that in Example 4 in the diffusion process of this example.

[EXAMPLE 7]

① Gel rod and diffusion monomer
(a) Gel rod

Monomer: CR-39

Polymerization initiator: IPP

Production method: After IPP of 2 wt % has been mixed with CR-39, the mixture is injected into a fluororesin tube having an inner diameter of 12.0 mm, and a length of 200 mm, and this tube including the mixture is heated in a 55° C. water bath for 1 hour and 10 minutes, so that a gel rod is produced.

(b) Diffusion monomer

It is mixed in the same way as that in Example 1.

② Diffusion apparatus

Figure 7:
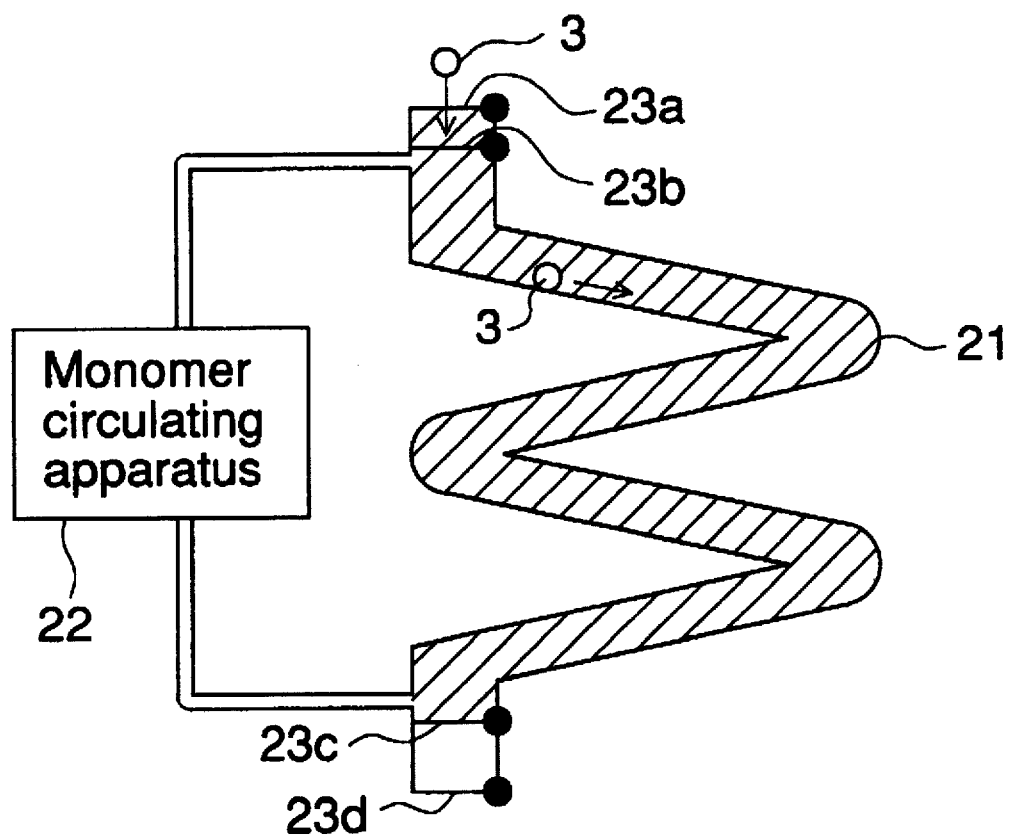
FIG. 7 is a front view showing a diffusion apparatus of Example 7.

As shown in FIG. 7, the diffusion monomer container 21 has a cross sectional form in which the gel rod 3 can be rolled, and the bends in the left and right directions, as shown in the drawing, are repeated several times from the upper end to the lower end.

Further, a monomer circulation apparatus 22 is provided, and the diffusion monomer is circulated from the lower end of the diffusion monomer container 21 to the upper end.

Gel rods 3 are sequentially placed into the diffusion monomer container 21 at the upper end, and allowed to roll down the inclined surface of the diffusion monomer container 21 due to its own weight. That is, the diffusion process is performed while the gel rod 3 is rotating around the horizontal axis in the diffusion monomer while rolling down in the diffusion monomer container 21.

Valves 23a and 23b for inserting the gel rod 3 are provided on the upper end of the diffusion monomer container 21, and valves 23c and 23d for removing the gel rod 3 are provided on the lower end of the container. After the valve 23a is opened and the gel rod is placed into the container, the valve 23a is closed, and after that, the valve 23b is opened so that the diffusion process starts with the rolling of the gel rod. After the diffusion process has been completed, the gel rod is accommodated in the space enclosed by the valves 23c and 23d when the valve 23c is opened and closed. After that, the gel rod is removed when the valve 23d is opened.

Here, the inclined surface of the diffusion monomer container 21 is set so that the number of rotations of the gel rod 3 is approximately 20 rpm. This inclined surface of the diffusion monomer container 21 corresponds to the rotation means of the other examples.

The gel rods 3 may be continuously inserted into the container 21 or may be inserted at predetermined time intervals. Alternatively, the next gel rod 3 may be inserted based on the rate of removal.

③ Diffusion and hardening processes

After the gel rod has been inserted into the diffusion apparatus in which the gel rod 3 is allowed to roll down as described above, and diffusion has been performed, the gel rod 3, in which the diffusion has been completed, is taken from the container, and heated at 40° to 90° C. for 10 hours in the temperature controlled oven. Then, the gel rod is hardened and polymerization is completed, so that the cross section of the gel rod is perfectly circular. After the hardening process, cooling, cutting and polishing are performed so that plastic lenses (plastic optical transmitting element) having the optical characteristic distribution are produced.

[EXAMPLE 8]

① Gel rod and diffusion monomer
(a) Gel rod

It is produced in the same way as that in Example 7.

(b) Diffusion monomer

It is mixed in the same way as that in Example 2.

② Diffusion apparatus

As shown in FIGS. 8(a) and 8(b), a container 24, in which a plurality of monomer containers 24a a are integrally accommodated near the circumference, is located on rollers 25, and the diffusion monomer 2 and the gel rod 3 are accommodated in each monomer container 24a.

The container main body 24 is held on a pair of rollers 25a and 25b, which are arranged horizontally being opposed to each other. The rotational driving force of the motor 9 is transmitted to the roller 25a by the belt 26. When the roller 25a is rotated, the container main body 24 is rotated while rotating the driven roller 25b.

At this time, the gel rod 3 accommodated in the monomer container 24a is rotated around the horizontal and symmetrical rotation axis in the diffusion monomer 2 while being in contact with the inner wall of the monomer container 24a. Uniform diffusion of the diffusion monomer can thereby be performed by the gel rod accommodated in each monomer container 24a.

The rotation means is composed of the rollers 25, the belt 26 and the motor 9. The number of rotations of the motor 9 is adjusted in this example so that the gel rod 3 rotates at approximately 20 rpm.

③ Diffusion and hardening processes

In the diffusion process, diffusion and hardening are performed in the same manner as that in Example 1 so that plastic lenses (plastic optical transmitting element) having the optical characteristic distribution are produced, excepting that the diffusion apparatus used in this example is different from that in Example 1.

[EXAMPLE 9]

① Gel rod and diffusion monomer
(a) Gel rod

It is produced in the same manner as that in Example 7, excepting that IPP density is 3.0 wt %, and heating time is 47 minutes.

(b) Diffusion monomer

It is mixed in the same manner as that in Example 1.

② Diffusion apparatus

Figure 9:
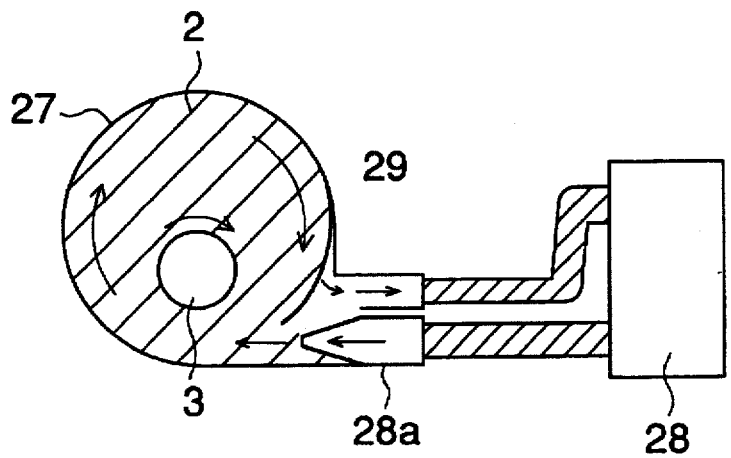
FIG. 9 is a front view showing a diffusion apparatus of Example 9.

As shown in FIG. 9, a diffusion monomer circulating apparatus 28 (rotation means) is provided so that a flow of the diffusion monomer is generated in the circumferential direction in the hollow cylindrical space in a cylindrical diffusion monomer container 27. The diffusion monomer removed from the container is jetted from a nozzle 28a in the circumferential direction at the lower end portion of the container, so that a circumferential flow is generated in the cylindrical container.

The gel rod 3 accommodated in the container 27 is rotated around the horizontal and symmetrical rotation axis by the flow of the diffusion monomer while floating in the diffusion monomer. Due to this rotation in the diffusion monomer, the diffusion monomer is uniformly diffused.

In this connection, in FIG. 9, numeral 29 is a net to prevent the gel rod 3 from being discharged from a collection exit for the diffusion monomer.

Here, the flow of monomer is adjusted so that the gel rod 3 is rotated at approximately 20 rpm in the diffusion monomer.

③ Diffusion and hardening processes

Diffusion and hardening are performed in the same manner as that in Example 1 so that plastic lenses (plastic optical transmitting element) having the optical characteristic distribution are produced, excepting that the diffusing apparatus used in the diffusion process is different from that in Example 1.

[EXAMPLE 10]

① Gel rod and diffusion monomer (a) Gel rod

It is produced in the same manner as that in Example 4, excepting that the fluororesin tube having an inner diameter of 12.0 mm, and a length of 100 mm, is used in this example.

(b) Diffusion monomer

It is mixed in the same manner as that in Example 1.

② Diffusion apparatus

Figure 10:
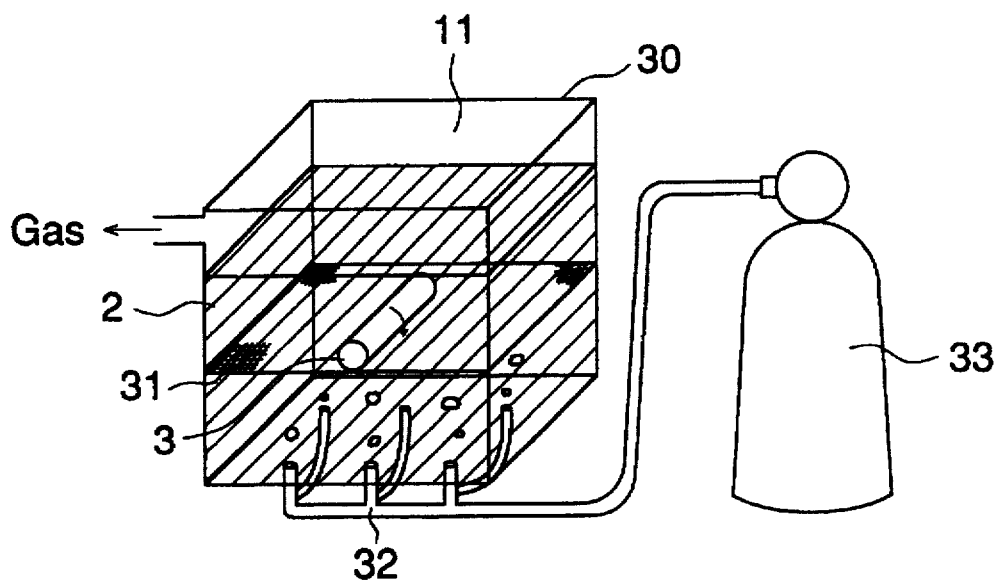
FIG. 10 is a perspective view showing a diffusion apparatus of Example 10.

In FIG. 10, the diffusion monomer is accommodated, allowing for a gap portion, in a box-shaped diffusion monomer container 30. A net 31 is immersed horizontally positioned in the diffusion monomer, and the gel rod 3 is placed on the net 31.

A plurality of inert-gas jet nozzles 32 are provided below the net 31. Inert gas sent from a gas cylinder is jetted upward from the nozzles 32 into the diffusion monomer.

A flow of the diffusion monomer is generated due to the inert gas jetted from the nozzles 32, and thereby, the gel rod 3 is rotated around its horizontal and symmetrical rotation axis in the diffusion monomer, so that the diffusion monomer is uniformly diffused.

In this example, the rotation means is composed of the jet nozzles 32, the gas cylinder 33 and the net 31.

Here, the jetting of the inert gas (for example, nitrogen gas) is adjusted so that the gel rod 3 is rotated at approximately 20 rpm.

In this connection, the jet nozzles for the inert gas may be arranged on left and right sides of the gel rod 3 so that the gel rod 3 is placed between the nozzles. The gel rod is reciprocally rolled left and right on the net when the inert gas is alternatingly jetted from the nozzles. Further, in the structure in which the inert gas is jetted upward from below the net as shown in FIG. 10, when the inert gas jetting nozzles 32 are sequentially switched from the right to the left, and then from the left to the right, the gel rod may be rolled in the left and right directions on the net.

Further, in the above structure, the diffusion monomer itself may be circulated and jetted instead of the inert gas.

③ Diffusion and hardening processes

Diffusion and hardening are performed in the same manner as that in Example 1 so that plastic lenses (plastic optical transmitting element) having the optical characteristic distribution are produced, excepting that the diffusion apparatus used in the diffusion process is different from that in Example 1.

[EXAMPLE 11]

① Gel rod and diffusion monomer (a) Gel rod

It is produced in the same manner as that in Example 2.

(b) Diffusion monomer

Figure 11:
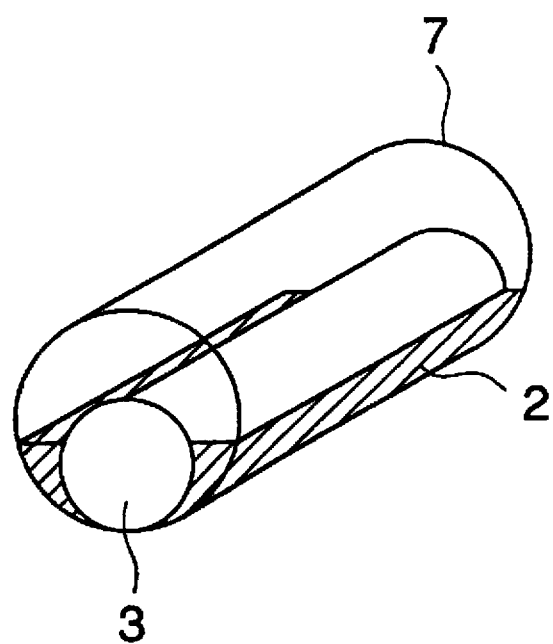
FIG. 11 is a perspective view of the container of Example 11, which shows the correlation of the amount of diffusion monomer with the gel rod.

It is mixed in the same manner as that in Example 2. The mixture is injected into a container 7 as used in Example 2, and the gel rod is inserted into the container 7. As shown in FIG. 11, the amount of the diffusion monomer is adjusted in such a manner that an upper circumferential portion of the gel rod, which is placed into the container 7 almost horizontally, projects from the surface of the diffusion monomer in the stationary mode, that is, only a portion of the gel rod is immersed in the diffusion monomer while the apparatus is stationary. After air in the container has been substituted with an inert gas such as nitrogen gas, the container is sealed to the atmosphere.

② Diffusion apparatus

As shown in FIG. 11, the container 7, in which the diffusion monomer 2 and the gel rod 3 are accommodated, is set on the diffusion apparatus as shown in FIG. 2 in Example 2, and the container 7 is rotated.

When the container 7 is rotated, the gel rod 3 is rotated in the vicinity of the bottom of the container 7, and the inert gas contacting portion and diffusion monomer contacting portion of the gel rod 3 are changed alternately. Accordingly, even when the amount of the diffusion monomer, in which whole the gel rod is immersed in the stationary mode, is not secured, the diffusion monomer can still be uniformly diffused.

③ Diffusion and hardening processes

Diffusion and hardening are performed in the same manner as that in Example 1 so that plastic lenses (plastic optical transmitting element) having the optical characteristic distribution, are produced, excepting that the diffusion apparatus used in the diffusion process is different from that in Example 1.

In order to evaluate the optical characteristics of the plastic lenses, having the optical characteristic distribution, which are produced by the production method and production apparatus described in each of Examples 1 through 11, plastic lenses having the optical characteristic distribution were produced in the following Comparative Examples 1through 4.

[Comparative Example 1]

The diffusion monomer was diffused and hardened and plastic lenses having the optical characteristic distribution were produced in the same manner as that in Example 2, excepting that the container was horizontally and statically placed so that it is not rotated in this diffusion process.

[Comparative Example 2]

The diffusion monomer was diffused and hardened and plastic lenses having the optical characteristic distribution were produced in the same manner as that in Example 8, excepting that the container was horizontally and statically placed so that it is not rotated in this diffusion process.

[Comparative Example 3]

The diffusion monomer was diffused and hardened and plastic lenses having the optical characteristic distribution were produced in the same manner as that in Example 9, excepting that monomer was not mixed in this diffusion process.

[Comparative Example 4]

The diffusion monomer was diffused and hardened and plastic lenses having the optical characteristic distribution were produced in the same manner as that in Example 2, excepting that the number of rotations of the container was 1000 rpm, which is excessively high, in this diffusion process.

In this connection, when the number of rotations of the monomer container was 1000 rpm, the gel base material was pressed by the centrifugal force to a fixed position on the inner wall of the container while the same surface of the gel base material was kept in contact in the same position, and the gel base material itself was not rotated.

The diffusion apparatus, conditions of gel production, and conditions of diffusion, described in Examples 1 through 11 and Comparative Examples 1 through 4, are arranged in order, and shown in the following Table 1.

Evaluations of optical characteristics of plastic lenses, having the optical characteristic distribution, which were produced by the diffusion apparatus, conditions of gel production, and conditions of diffusion, described in the above Examples 1 through 11 and Comparative Examples 1 through 4, were obtained as shown in Table 2.

TABLE 1

Figure 8:
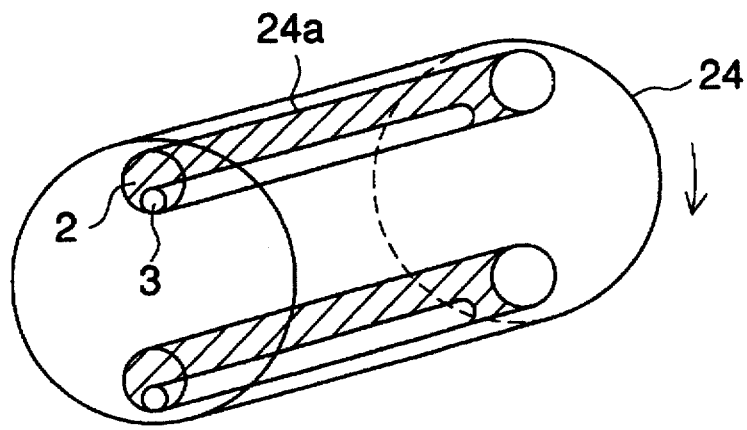
FIGS. 8(a) and 8(b) are views showing a diffusion apparatus of Example 8.
Figure 8:
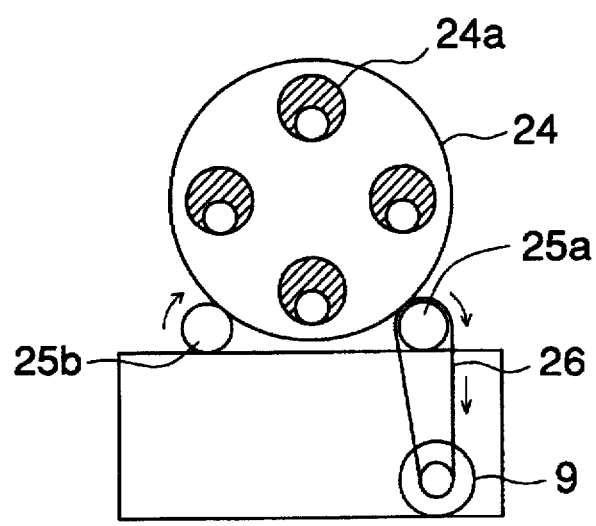

| Example | Drawing of apparatus | Gel production conditions | | | | | | Diffusion Conditions | | | | |
|---|---|---|---|---|---|---|---|---|---|---|---|---|
| | | Mono-mer | Initi-ator | Temper-ature of initiator (wt %) | Gel production temper-ature (°C.) | Gel production times (hr) | Dia-meter of rod (mm) | Length of rod (mm) | Mono-mer | Initiator | Temper-ature of initiator (wt %) | Rotation speed of gel rod (rpm) | Diffu-sion times (hr) |
| Example 1 | FIG. 1 | CR-39 | IPP | 2 | 50 | 2 hr 15 min | 12 | 100 | DAI | IPP | 2 | 20 | 10 |
| Example 2 | FIG. 2 | CR-39 | IPP | 2 | 50 | 2 hr 15 min | 12 | 100 | DAI | IPP | 3 | 20 | 10 |
| Example 3 | FIG. 3 | CR-39 | IPP | 3 | 50 | 1 hr 35 min | 12 | 100 | DAI | IPP | 2 | 50 | 10 |
| Example 4 | FIG. 4 | CR-39 | IPP | 2 | 45 | 4 hr 30 min | 8 | 100 | DAI | IPP | 2 | 200 | 6 |
| Example 5 | FIG. 5 | CR-39 | IPP | 2 | 45 | 4 hr 30 min | 8 | 100 | DAI | IPP | 3 | 10 | 6 |
| Example 6 | FIG. 6 | CR-39 | IPP | 3 | 45 | 2 hr 45 min | 8 | 100 | DAI | IPP | 2 | 10 | 6 |
| Example 7 | FIG. 7 | CR-39 | IPP | 2 | 55 | 1 hr 10 min | 12 | 200 | DAI | IPP | 2 | 20 | 10 |
| Example 8 | FIG. 8 | CR-39 | IPP | 2 | 55 | 1 hr 10 min | 12 | 200 | DAI | IPP | 3 | 20 | 10 |
| Example 9 | FIG. 9 | CR-39 | IPP | 3 | 55 | 0 hr 47 min | 12 | 200 | DAI | IPP | 2 | 20 | 10 |
| Example 10 | FIG. 10 | CR-39 | IPP | 2 | 45 | 4 hr 30 min | 12 | 200 | DAI | IPP | 2 | 20 | 10 |
| Example 11 | FIG. 11 | CR-39 | IPP | 2 | 50 | 2 hr 15 min | 12 | 100 | DAI | IPP | 3 | 20 | 10 |
| Comparative Example 1 | FIG. 2 | CR-39 | IPP | 2 | 50 | 2 hr 15 min | 12 | 100 | DAI | IPP | 3 | 0 | 10 |
| Comparative Example 2 | FIG. 8 | CR-39 | IPP | 2 | 55 | 1 hr 10 min | 12 | 200 | DAI | IPP | 3 | 0 | 10 |
| Comparative Example 3 | FIG. 9 | CR-39 | IPP | 3 | 55 | 0 hr 47 min | 12 | 200 | DAI | IPP | 2 | 0 | 10 |
| Comparative Example 4 | FIG. 2 | CR-39 | IPP | 2 | 50 | 2 hr 15 min | 12 | 100 | DAI | IPP | 3 | 0 | 10 |

TABLE 2

| | Drawing of apparatus | $\Delta n$ | Effective diameter (mm) | Thick-ness of lens (mm) | N(1d) | N(1s)–N(1l) | Refractive index H (allowable value) (mm) | Abbe's number H (allowable value) (mm) | H (measured value) (mm) |
|---|---|---|---|---|---|---|---|---|---|
| Example 1 | FIG. 1 | 0.025 | 5.6 | 2 | 4.5E-0.3 | 5.1E-0.4 | 0.22 | 0.19 | 0.08 |
| Example 2 | FIG. 2 | 0.030 | 5.6 | 2 | 5.4E-0.3 | 6.2E-0.4 | 0.19 | 0.16 | 0.08 |
| Example 3 | FIG. 3 | 0.030 | 5.6 | 2 | 5.4E-0.3 | 6.2E-0.4 | 0.19 | 0.16 | 0.12 |
| Example 4 | FIG. 4 | 0.020 | 5.6 | 2 | 5.6E-0.3 | 6.4E-0.4 | 0.18 | 0.16 | 0.10 |
| Example 5 | FIG. 5 | 0.024 | 3.6 | 2 | 6.7E-0.3 | 7.7E-0.4 | 0.15 | 0.13 | 0.11 |
| Example 6 | FIG. 6 | 0.024 | 3.6 | 2 | 6.7E-0.3 | 7.7E-0.4 | 0.15 | 0.13 | 0.12 |
| Example 7 | FIG. 7 | 0.028 | 5.6 | 2 | 5.0E-0.3 | 5.7E-0.4 | 0.20 | 0.17 | 0.10 |
| Example 8 | FIG. 8 | 0.030 | 5.6 | 2 | 5.4E-0.3 | 6.2E-0.4 | 0.19 | 0.16 | 0.08 |
| Example 9 | FIG. 9 | 0.030 | 5.6 | 2 | 5.4E-0.3 | 6.2E-0.4 | 0.19 | 0.16 | 0.10 |
| Example 10 | FIG. 10 | 0.028 | 5.6 | 2 | 5.0E-0.3 | 5.7E-0.4 | 0.20 | 0.17 | 0.12 |
| Example 11 | FIG. 11 | 0.028 | 5.6 | 2 | 5.0E-0.3 | 5.7E-0.4 | 0.20 | 0.17 | 0.09 |

TABLE 2-continued

| | Drawing of apparatus | Δn | Effective diameter (mm) | Thickness of lens (mm) | N(1d) | N(1s)-N(1l) | Refractive index H (allowable value) (mm) | Abbe's number H (allowable value) (mm) | H (measured value) (mm) |
|---|---|---|---|---|---|---|---|---|---|
| Comparative Example 1 | FIG. 2 | 0.031 | 5.6 | 2 | 5.5E-0.3 | 6.4E-0.4 | 0.18 | 0.16 | 0.40 |
| Comparative Example 2 | FIG. 8 | 0.030 | 5.6 | 2 | 5.4E-0.3 | 6.2E-0.4 | 0.19 | 0.16 | 0.35 |
| Comparative Example 3 | FIG. 9 | 0.028 | 5.6 | 2 | 5.0E-0.3 | 5.7E-0.4 | 0.20 | 0.17 | 0.28 |
| Comparative Example 4 | FIG. 2 | 0.025 | 5.6 | 2 | 4.5E-0.3 | 5.1E-0.4 | 0.22 | 0.19 | 0.30 |

In Table 2, H (mm) shows a shift or deviation between the center of the distribution of optical characteristics (refractive index, Abbe's number, etc.) and the center of the external figure of the lens. When the coefficient of a term of the second order, in the case where the refractive index distribution is expressed by the following equation with respect to the distance r (mm) from the optical axis, $$\Delta N = N_0 + N_1 r^2 + N_2 r^4 + \ldots,$$

which is a value corresponding to the central wavelength (normally, d-line (587 nm)) in the wavelength region to be used, is expressed by $N_{1m}$, then, an allowable shift of the refractive index distribution is calculated as follows using the thickness of the lens t (mm) on the optical axis.
[Equation 5]

The allowable shift of the refractive index distribution=$2.0 \times 10^{-3}/(|N_{1m}| \times t)$.

When coefficients of a term of the second order in the case where the refractive index distribution is expressed by the following equation with respect to the distance r (mm) from the center of the optical axis, $$\Delta N = N_0 + N_1 r^2 + N_2 r^4 + \ldots,$$

which are values corresponding to the short wavelength (normally, F-line (486 nm)) side, and the long wavelength (normally, C-line (656 nm)) side in the wavelength region to be used, are respectively expressed by $N_{1s}$ and $N_{1l}$, then, the allowable shift of the distribution of the Abbe's number is expressed by the following equation:
[Equation 6]

The allowable shift of the distribution of the Abbe's number=$2.0 \times 10^{-4}/(|N_{1s} - N_{1l}| \times t)$.

As can clearly be seen from Table 2, in plastic lenses produced by the production apparatus and production methods of Examples 1 through 11, all the observational values of shift H between the center of the distribution of the optical characteristics (refractive index and Abbe's number) and the center of the outer form of lens, satisfy the following relationships.
[Equation 7]

$$H \leq 2.0 \times 10^{-3}/(|N_{1m}| \times t)$$

[Equation 8]

$$H \leq 2.0 \times 10^{-4}/(|N_{1s} - N_{1l}| \times t)$$

All the shifts between the center of the optical characteristic distribution and the center of the outer form of the lens are within the allowable shift range.

On the other hand, in the Comparative Examples 1 through 4, all the diffusion process are carried out without rotating the gel rod in the diffusion monomer. Accordingly, the shifts are not within the allowable range. As can clearly be seen from Table 2, when diffusion is performed while the gel rod is being rotated in the diffusion monomer, the diffusion monomer is uniformly diffused.

As the monomer which is used for the gel rod and the diffusion process, a monomer having a polymerization functional group, which is conventionally obvious to skilled persons, and which is polymerized by heat, light, or the like, can be used in this invention. For example, a monomer having an unsaturated group, such as vinyl monomer, acrylic monomer, methacrylic monomer, styrene monomer, acetylene monomer, or the like, can be used singly, or as a mixture of plural monomers.

As the monomer to form the gel rod, a compound which can form network polymers and has plural polymerizable unsaturated groups, is desirable. For example, ethylene glycol dimethacrylate, diethylene glycol bisallyl carbonate, divinyl benzene, diallyl isophthalate, diallyl terephthalate, or the like, can be used.

For a polymerization initiator, widely known thermal polymerlization initiators or photopolymerization initiators is preferably used, and the widely known radical initiator can be used.

The gelling ratio of the optical transmitting base material is preferably 15to 40%.

The gelling ratio is defined as the ratio (percentage: %) of the weight W(P) of the polymer after polymerization to the weight W(M) of the monomer used for polymerization, and expressed by the following equation.

Gelling ratio (%)=$W(P)/W(M) \times 100$

The polymer weight W(P) is the weight of the portion which is not dissolved when a solvent, in which monomers can be dissolved and polymers can not be dissolved, is used and the gel base material is processed by a predetermined method, according to conventional methods.

The number of rotations of the gel rod is preferably 1 through 500 rpm, and specifically 5though 100.

For polymerization of the gel rod after the completion of diffusion, any type of heat, or activation energy rays such as ultraviolet radiation, electron beams, radioactive rays or the like, may be used. It is preferable that the gel rod is polymerized by using a predetermined forming method, such as molding or the like, to form the outer shape.

After completion of polymerization, the gel rod may be used as a rod lens after polishing both ends, or as a lens after cutting and polishing.

Where the gel rod or diffusion monomer normally comes into contact with air in the diffusion process (Examples 3, 4, 10, and 11), it is preferable that the production atmosphere is substituted with inert gas. When it is necessary to introduce gas into diffusion monomer (Example 10), an inert gas is also desirable. As the inert gas, $N_2$, He, Ar or the like, are preferable.

As described above, in the present invention, in the diffusion process in which the diffusion monomer is diffused into the light transmitting element, the base material is rotated in the monomer, and thereby, the monomer is uniformly diffused into the base material. Accordingly, a plastic light transmitting element can be obtained by the present invention, in which a shift between the center of the outer form of the plastic light transmitting element and the center of the optical characteristic distribution is largely reduced.

In the present invention, a torque is applied to the base material by the movement of the supporting member so that the base material is rotated in the monomer, and thereby, the monomer can be uniformly diffused into the base body.

The base material is rotated in the monomer when the supporting member is rotated, and thereby, the monomer can be uniformly diffused into the base material.

The base material is rotated when the monomer container, as the supporting member, is rotated, and thereby, the monomer can be uniformly diffused into the base material.

When a plurality of monomer containers, as the supporting members, are integrally rotated, the base material in each monomer container is simultaneously rotated, and thereby, the diffusion process can be performed.

The base material, supported by a pair of rollers as the supporting member, is rotated in the monomer when the rollers are rotated, and thereby, the monomer can be uniformly diffused into the base material.

The base material, supported by a belt as the supporting member, is rotated in the monomer when the belt is rotated, and thereby, the monomer can be uniformly diffused into the base material.

The base material is rotated when the supporting member is oscillated, and thereby, the monomer can be uniformly diffused into the base material.

The base material, which is accommodated with the monomer in the monomer container, is rotated when the monomer container, as the supporting member, is oscillated, and thereby, the monomer can be uniformly diffused into the base material.

The base material is rotated in the monomer when the supporting member is horizontally moved, and thereby, the monomer can be uniformly diffused into the base material.

When the monomer container, as the supporting member, is horizontally moved, the base material is rotated in the monomer, and thereby, the monomer can be uniformly diffused into the base material.

The base material is rotated in the monomer when the system is structured such that the base material rolls down an inclined surface, and thereby, the monomer can be uniformly diffused into the base material.

The base material is rotated in the monomer by monomer flow, and thereby, the monomer can be uniformly diffused into the base material.

The base material is rotated in the monomer by a gas flow introduced into the monomer, and thereby, the monomer can be uniformly diffused into the base material.

In cases where the base material is symmetrical with the rotation axis, as in a cylinder, when the base material is rotated around its symmetrical rotation axis in the monomer, the monomer can be uniformly diffused with respect to the circumferential wall of the base material.

When the symmetrical rotation axis is positioned approximately horizontal, the base material is subjected to gravity, and thereby, the monomer can be uniformly diffused parallel to the rotation axis.

When the base material is rotated around the horizontal axis, the base material is subjected to gravity, and thereby, the monomer can be uniformly diffused parallel to the rotation axis.

When the rotation of the base material in the monomer is 1 through 500 rpm, diffusion can be uniformly performed, and damage of the base material can also be prevented.

When the rotation of the base material in the monomer is 5 through 100 rpm, both uniform diffusion and prevention of damage can be highly compatible.

Based on the wavelength region to be used and the secondary characteristics of the refractive index distribution, allowable values of a shift H (mm) between the center of the optical characteristic distribution and the center of the outer form of the light transmitting element are set, and thereby, the plastic light transmitting element having a shift within appropriate allowable values can be obtained.

What is claimed is:

1. A light transmitting plastic member having a refractive index distribution and an optical axis, comprising an external figure having a center, wherein a deviation H (mm) between the center of the refractive index distribution and the center of the external figure of the light transmitting plastic member satisfies the following equation:

$$H \leq 2.0 \times 10^{-3} / (|N_{1m}| \times t)$$

wherein $N_{1m}$ is a coefficient of the second order of the refractive index distribution and is a value corresponding to a central wavelength in the wavelength region used in the case where the refractive index distribution is expressed by the following equation with respect to a distance r (mm) from the optical axis, $$\Delta N = N_o + N_1 r^2 + N_2 r^4 + \ldots, \text{ and}$$

t(mm) is the thickness of the light transmitting plastic member on the optical axis.

2. A light transmitting plastic member having a refractive index distribution and an optical axis, comprising an external figure having a center, wherein a deviation H (mm) between the center of an Abbe's number distribution and the center of the external figure of the light transmitting plastic member satisfies the following equation:

$$H \leq 2.0 \times 10^{-4} / (|N_{1s} - N_{1l}| \times t)$$

wherein $N_{1s}$ and $N_{1l}$ are a coefficient of the second order of the refractive index distribution and are a value corresponding to a short wavelength and a long wavelength respectively in the wavelength region used in the case where the refractive index distribution is expressed by the following equation with respect to a distance r (mm) from the optical axis, $$\Delta N = N_o + N_1 r^2 + N_2 r^4, \ldots, \text{ and}$$

t(mm) is the thickness of the light transmitting plastic member on the optical axis.

3. A light transmitting plastic member having a desired optical distribution, comprising:

a diffused base material manufactured from a gelled base material, wherein the gelled base material is partially polymerized, shaped so as to have a rotation axis, placed in a monomer having an optical characteristics different from that of the gelled base material; and rotated around the rotation axis thereof in the monomer so that the monomer is diffused into the gelled base material while the gelled base material is rotated.

4. The light transmitting plastic member of claim 3, wherein the gelled base material is placed on a supporter, and the gelled base material is rotated with the movement of the supporter.

5. The light transmitting plastic member of claim 4, wherein the movement of the supporter is a rotational movement.

6. The light transmitting plastic member of claim 5, wherein the supporter is a belt, and the gelled base material is rotated with the rotation of the belt.

7. The light transmitting plastic member of claim 4, wherein the supporter is a container containing the monomer, and the gelled base material is rotated with the rotation of the container.

8. The light transmitting plastic member of claim 7, wherein the container is composed of a plurality of containers which are rotated as one unit, and the gelled base material is rotated in each container.

9. The light transmitting plastic member of claim 4, wherein the supporter is a pair of rollers, and the gelled base material is rotated with the rotation of the rollers.

10. The light transmitting plastic member of claim 4, wherein the supporter is a rocking member, and the gelled base material is rotated with the rocking motion.

11. The light transmitting plastic member of claim 10, wherein the rocking member is a container containing the monomer, and the gelled base material is rotated with the rocking motion of the container.

12. The light transmitting plastic member of claim 4, wherein the supporter is movable in the horizontal direction, and the gelled base material is rotated with the horizontal movement of the supporter.

13. The light transmitting plastic member of claim 12, wherein the supporter is a container movable in the horizontal direction, and the gelled base material is rotated with the horizontal movement of the container.

14. The light transmitting plastic member of claim 4, wherein the supporter is an inclined surface on which the gelled base material rolls downwardly causing the base material to rotate.

15. The light transmitting plastic member of claim 3, wherein the rotation axis of the gelled base material is a symmetrical rotation axis, and the gelled base material is rotated around the symmetrical rotation axis.

16. The light transmitting plastic member in claim 15, wherein the symmetrical rotation axis is substantially horizontal.

17. The light transmitting plastic member of claim 3, wherein the gelled base material is rotated at a rotation speed of 1 rpm to 500 rpm in the monomer.

18. The light transmitting plastic member of claim 17, wherein the rotation speed is 5 rpm to 100 rpm.

19. The light transmitting plastic member claim 3, wherein a flow of the monomer is created and the gelled base material is rotated with the flow of the monomer.

20. The light transmitting plastic member of claim 3, wherein a gas flow is created in the monomer and the gelled base material is rotated with the gas flow.

21. The light transmitting plastic member of claim 3, wherein the rotation axis is substantially horizontal.

* * * * *

UNITED STATES PATENT AND TRADEMARK OFFICE
CERTIFICATE OF CORRECTION

PATENT NO. : 5,701,377　　　　　　　　　　Page 1 of 2

DATED : December 23, 1997

INVENTOR(S) : Atsuko Ichikawa et al

It is certified that error appears in the above-indentified patent and that said Letters Patent is hereby corrected as shown below:

On the Title page, item [57], in the Abstract, line 4, "places" should read --placed--; and in lines 4-5, before "optical", delete "an".

Claim 2, column 22, line 44, after "external", delete ",".

Claim 2, column 22, line 51, after "$N_{1s}$" delete ",".

UNITED STATES PATENT AND TRADEMARK OFFICE
CERTIFICATE OF CORRECTION

PATENT NO. : 5,701,377
DATED : December 23, 1997
INVENTOR(S) : Atsuko ICHIKAWA et al.

It is certified that error appears in the above-indentified patent and that said Letters Patent is hereby corrected as shown below:

Claim 2, column 22, line 59, "$N_2r^4$," should read --$N_2r^{4+}$--.

Claim 3, column 23, line 1, before "optical", delete "an".

Claim 19, column 24, line 24, before "claim 3", insert --of--.

Signed and Sealed this

Twenty-first Day of July, 1998

Attest:

Attesting Officer

BRUCE LEHMAN

Commissioner of Patents and Trademarks